United States Patent
Kohl et al.

(10) Patent No.: US 6,218,814 B1
(45) Date of Patent: Apr. 17, 2001

(54) DEVICE FOR VOLTAGE SUPPLY WITH SUPPRESSION OF LOAD RESPONSE FUNCTION DURING REDUCTION OF RPM

(75) Inventors: Walter Kohl, Lauffen; Rainer Mittag, Kornwestheim; Guenter Nasswetter, Gomaringen; Helmut Suelzle, Freiberg, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/269,053

(22) PCT Filed: Apr. 11, 1997

(86) PCT No.: PCT/DE97/00735

§ 371 Date: Mar. 18, 1999

§ 102(e) Date: Mar. 18, 1999

(87) PCT Pub. No.: WO98/12792

PCT Pub. Date: Mar. 26, 1998

(30) Foreign Application Priority Data

Sep. 19, 1996 (DE) ................................ 196 38 357

(51) Int. Cl.[7] ........................................ H02P 9/48
(52) U.S. Cl. .................. 322/28; 322/19; 322/29
(58) Field of Search .................. 322/17, 19, 25, 322/27, 28, 29

(56) References Cited

U.S. PATENT DOCUMENTS

| | | | | |
|---|---|---|---|---|
| 4,379,990 | * | 4/1983 | Silvers et al. | 322/99 |
| 4,413,222 | * | 11/1983 | Gansert et al. | 320/48 |
| 4,459,489 | * | 7/1984 | Kirk et al. | 290/13 |
| 4,777,425 | * | 10/1988 | MacFarlane | 322/28 |
| 4,931,717 | * | 6/1990 | Gray et al. | 323/299 |
| 5,225,764 | * | 7/1993 | Falater | 322/28 |
| 5,262,711 | | 11/1993 | Mori et al. | 322/28 |
| 5,561,363 | * | 10/1996 | Mashino et al. | 322/25 |
| 5,731,690 | * | 3/1998 | Taniquchi et al. | 322/28 |

* cited by examiner

*Primary Examiner*—Nicholas Ponomarenko
(74) *Attorney, Agent, or Firm*—Michael J. Striker

(57) ABSTRACT

A device for voltage regulation for a generator driven by an internal combustion engine is described in which the voltage regulator is equipped with a load response travel function (LRF), which prevents a rapid rise in the exciting current when a powerful electric consumer is turned on. By means of a suitable trigger circuit which evaluates the engine rpm and thus the generator rpm, the load response travel function is blocked during travel when rpm values are falling, so that in this case, the voltage incursions that occur during an active load-response function are maximally averted.

6 Claims, 2 Drawing Sheets

DEVICE FOR VOLTAGE SUPPLY WITH SUPPRESSION OF LOAD RESPONSE FUNCTION DURING REDUCTION OF RPM

SUMMARY

The device for voltage regulation according to the invention, for an externally excited generator driven by an internal combustion engine has the advantage that the number of voltage incursions that occur after powerful electric consumers are turned on is reduced markedly compared with known systems. This advantage is attained in that the load response travel function, which is activated while driving, is blocked under certain conditions. These conditions pertain to detecting an rpm reduction; when the rpm is falling, the load response travel function is blocked, and as a result a rapid rise in the exciting current is obtained, which leads to a power output on the part of the generator that prevents a voltage incursion. At a constant rpm or at increasing rpm, the load response travel function conversely remains activated, and it prevents the braking moment of the generator to the engine from rising when powerful consumers are turned on.

Further advantages of the invention will become apparent from the provisions recited in the dependent claims. It is especially advantageous that to determine the rpm, the phase signal of the generator is evaluated. To that end, it is not absolutely necessary to evaluate the engine crankshaft rpm, but it may nevertheless be advantageous under certain circumstances to evaluate the crankshaft rpm, or to take it jointly into account.

It is also advantages that the evaluation means that enable the deactivation of the load response travel function upon an rpm reduction can be realized as a very simple circuit, with only a few electronic components. A feature that can be achieved with the aid of special logic makes it possible to integrate the entire function in a microprocessor. With the features proposed, it is assured in each case that voltage incursions when loads are turned on will occur only if they are technologically absolutely indispensable, or absolutely unavoidable.

BRIEF DESCRIPTION OF THE DRAWINGS

An exemplary embodiment of the invention is shown in FIG. 1 of the drawing and will be described in further detail in the ensuing description.

DESCRIPTION OF PREFERRED EMBODIMENTS

Figure 1:
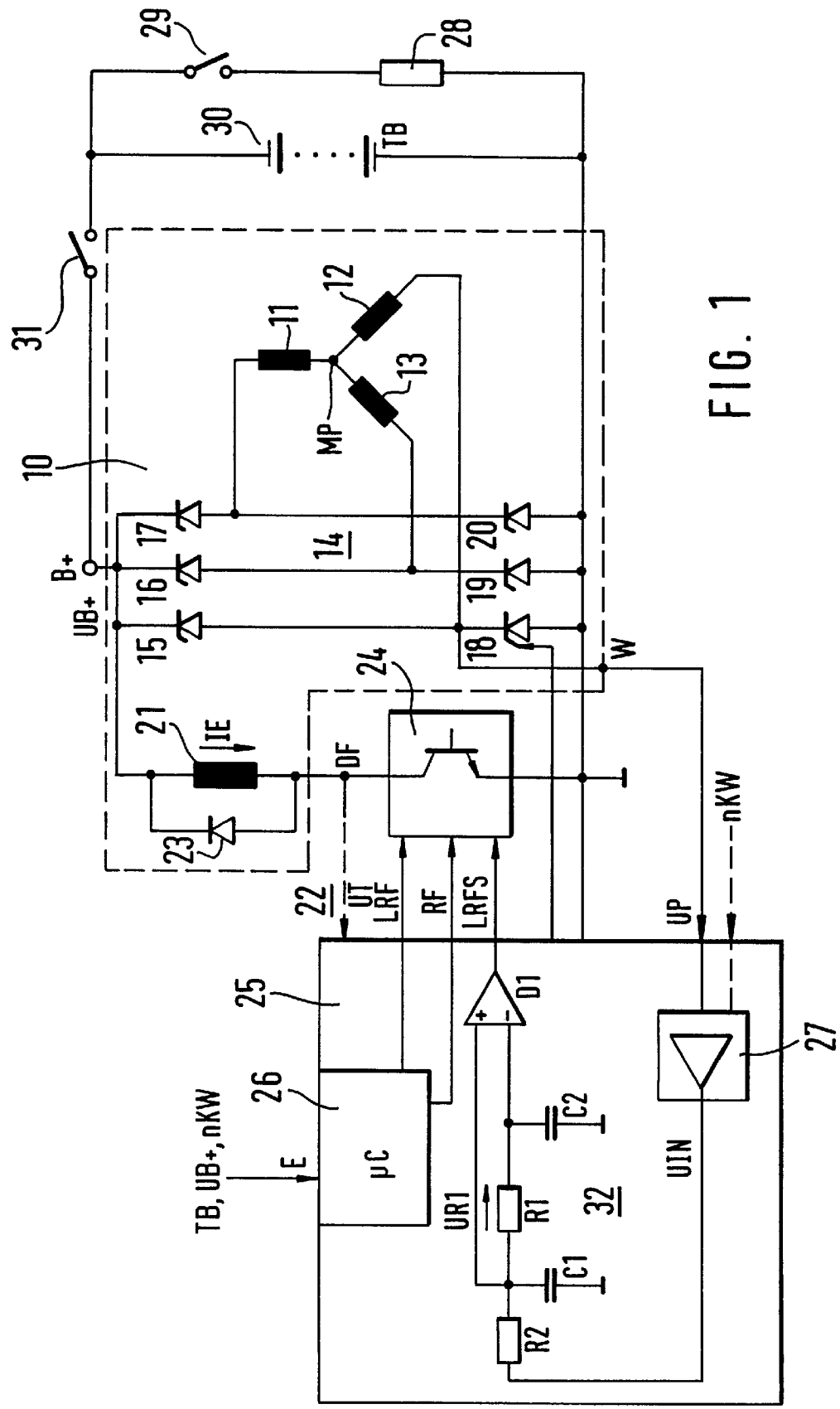

In FIG. 1, the components of the generator, voltage regulator and on-board vehicle electrical system needed for comprehension of the invention are shown. In detail, what is shown of the generator 10 is the stator windings 11, 12, 13, which are connected to a common center point MP and lead to the rectifier bridge 14. The rectifier bridge 14 comprises six rectifiers, for instance controlled rectifiers 15–20, which furnish the generator output voltage UB+ and the current IL at the B+ terminal. The exciter winding 21 of the generator is also shown, through which the exciting current IE flows that is regulated with the aid of the voltage regulator 22. The recovery diode 23 is also connected parallel to the exciter winding 21.

The voltage regulator 22 includes the power end stage 23 with the regulating transistor. Triggering of the power end stage 23 of the voltage regulator 22 is done with the aid of the control stage 25, which furnishes the requisite trigger functions of load response travel LRF, load response travel blocking LRFS, and the usual regulating functions RF for triggering the power transistor of the voltage regulator. These functions are generated by the aid of a microprocessor 25 and the circuit 32 in the control part of the voltage regulator. The microprocessor 25 is supplied via inputs E with the required data, such as the voltage IB+, the battery temperature TB, the crankshaft rpm nKW, and so forth, which are typically taken into account in voltage regulation.

Figure 2:
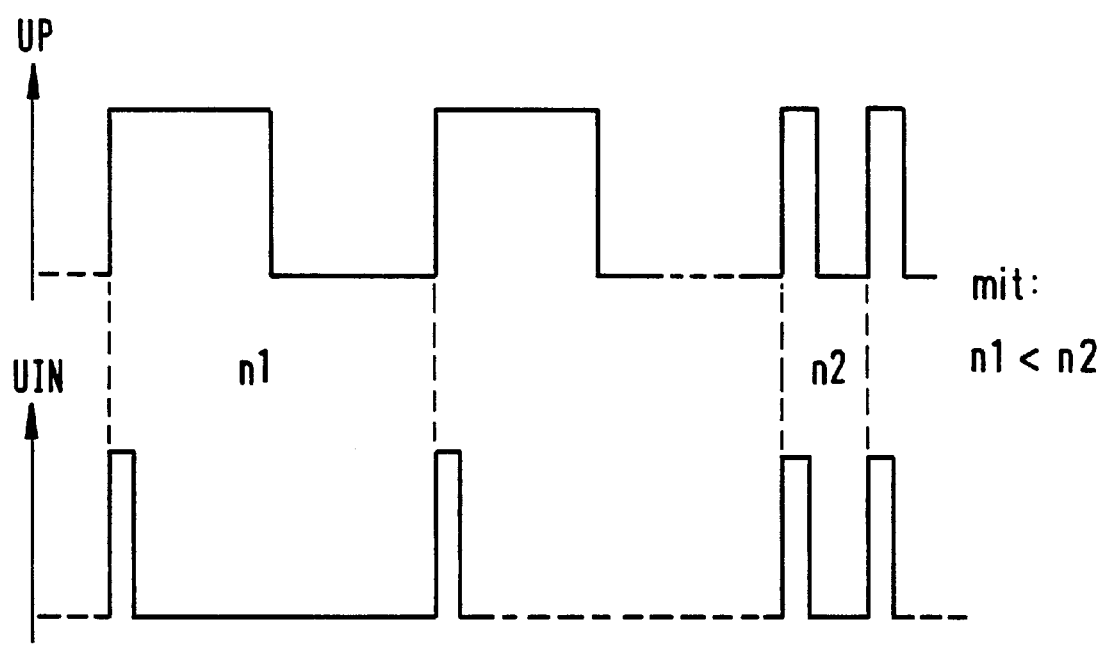
In FIG. 2, the phase signal, which can be picked up at a winding of the generator and is evaluated according to the invention, is plotted as a function of time.

For generating the load response travel blocking function LRFS, the circuit 32 included in the control part 25 of the regulator is used, which comprises the following components: In a signal processing circuit 27 not identified in further detail, the phase signal UP picked up in one phase of the generator, which is an rpm-dependent signal, is processed into uniform square-wave pulses, designated UIN. Both the phase signal and the processed signal are also shown in FIG. 2. The generator terminal where the phase signal UP is picked up is designated W. The rpm of the crankshaft nKW could also be used as the rpm signal.

The processed phase signal UIN is delivered to the circuit arrangement 32 for blocking the load response function LRFS. This circuit arrangement includes two series-connected resistors R1, R2 and two parallel-connected capacitors C1 and C2; C1 is connected between R1 and R2, and C2 is connected to R1. The connection between the resistor R1 and the capacitor C2 leads to the inverting input of a differential amplifier D1, to whose noninverting input the voltage UR1 dropping at the resistor R1 is supplied.

With the circuit that includes the resistors R1, R2, the capacitor C1, C2, and the differential amplifier D1, the desired load response travel blocking function LRFS can be realized. Otherwise, when a powerful consumer, designated by 28 in FIG. 1, is turned off, the load response travel function would be activated. The consumer 28, which can be connected to the battery 30 via the switch 29, or if the ignition switch 31 is closed can also be connected to the generator terminal B+, is a low-resistance consumer, which is severely burdened when the generator is turned on. As long as the load response travel function is active, the rise time of the exciting current IE after a powerful consumer is turned on is limited. The reason for a positive change in the exciting current is first an increased demand for current because the consumer has been turned on and second a low rpm of the generator, which prevents major outputs of power. As long as the load response function is active, a voltage incursion occurs in principle in the on-board electrical system. This voltage incursion is unwanted and is avoided by the blocking of the load response function under certain circumstances as proposed by the invention. To that end, with the circuit comprising the resistors R1, R2, the capacitor C1, C2, and the differential amplifier D1, a negative rpm change is detected from the signal UIN supplied, and the output signal of the differential amplifier D1 blocks the load response function. The relationship among rpm, the voltage level at the capacitors C1 and C2, and the triggering of the load response function can be learned from the following table:

| RPM | Voltage Level | LRF Triggering |
|---|---|---|
| Constant | $C1 = C2 \longrightarrow U_{R1} = 0$ | Enabled |
| Rising | $C1 > C2 \longrightarrow U_{R1} > 0$ | Enabled |
| Falling | $C1 < C2 \longrightarrow U_{R1} < 0$ | Blocked |

As can be seen from this logic table, at constant or rising rpm, triggering of the load response travel function is enabled. If the rpm is falling, this triggering is blocked. If the load response travel function is inactive, the exciting current rises rapidly as needed, an although this exerts a braking moment on the engine crankshaft, it normally prevents a voltage incursion.

What is claimed is:

1. A device for regulating voltage in a generator driven by an internal combustion engine and having an exciter winding, the device comprising a voltage regulator which has a control part and a power part and regulates a current flowing through the exciter winding to keep an output voltage of the generator constant, means for additionally limiting an exciting current during occurrence of predeterminable rpm-dependent conditions, said means for additionally limiting the exciting current being operative for triggering said power part of said voltage regulator with a load response travel function formed by said control part of said voltage regulator, and said load response travel function is blocked when an evaluation of an rpm signal makes a conclusion about a dropping rmp.

2. A device as defined in claim 1; and further comprising a circuit arrangement which blocks the load response travel function and is arranged so that a phase voltage of the generator is delivered; and a differential amplifier, a series circuit of resistors, and parallel-connected capacitors arranged so that said phase voltage is converted into a square-wave voltage with uniform pulses which are delivered to said differential amplifier via said series circuit of resistors and said parallel-connected capacitors.

3. A device as defined in claim 2, wherein said differential amplifier has an inverting input and a non inverting input, said non inverting input of said differential amplifier being connected to a connection between two of said resistors and one of said capacitors, while said inverting input of said differential amplifier is connected to a connection between a remaining one of said resistors and another of said capacitors.

4. A device as defined in claim 1, wherein said voltage regulator includes means for additionally limiting the exciting current; and means for blocking an additional limitation of the exciting current.

5. A device as defined in claim 1, wherein said voltage regulator includes a power part with a power transistor and a control part for generating trigger signals for said power part.

6. A device as defined in claim 1; and further comprising means for supplying to said voltage regulator further signals selected from the group consisting of rpm of an engine crankshaft signals, generator output voltage signals, and a temperature of a battery signals, so that said signals which represent corresponding variables can be taken into account in a regulator of the exciting current.

* * * * *